Jan. 20, 1970     T. J. MOTTER ET AL     3,490,988

PHOTOTROPIC COMPOUNDS AND ARTICLES PRODUCED THEREWITH

Filed June 23, 1967     2 Sheets-Sheet 1

INVENTORS
Theodore J. Motter
and Paul T. Mattimoe
BY Nobbe & Collins
ATTORNEYS

United States Patent Office 3,490,988
Patented Jan. 20, 1970

3,490,988
PHOTOTROPIC COMPOUNDS AND ARTICLES
PRODUCED THEREWITH
Theodore J. Motter, near Genoa, and Paul T. Mattimoe, Toledo, Ohio, assignors to Libbey-Owens-Ford Glass Company, Toledo, Ohio, a corporation of Ohio
Filed June 23, 1967, Ser. No. 648,320
Int. Cl. B32b *17/10;* C08k *1/02*
U.S. Cl. 161—199          15 Claims

ABSTRACT OF THE DISCLOSURE

Phototropic, substituted metallo thiocarbohydrazides; solid, semi-solid, plastic and liquid bodies rendered phototropic by the inclusion of such compounds; and phototropic units produced by combining such bodies with other elements or materials.

---

The invention relates broadly to special phototropic compounds and more particularly to bodies that have been rendered phototropic by the incorporation therein or the association therewith of these compounds. It specifically contemplates within its scope plastic bodies of this character that are suitable for use as laminae or interlayers in laminated safety glass units, as well as liquid, semi-liquid or plastic materials or bodies that can be employed as coatings or in the spaces of cell type or porous structures.

Phototropic compounds per se are of course known and the desirability of providing a laminated safety glass unit in which the plastic interlayer has been rendered photo- and/or thermotropic thereby has been recognized, as have some of the possibilities of phototropic liquid bodies (see for example, U.S. Patent No. 2,710,274 to G. W. Kuehl and British Patent No. 1,010,234).

According to the present invention there is provided first, a series or family of special phototropic compounds; second, a number of different forms of phototropic bodies incorporating these compounds, that can be employed in a variety of ways; and, finally, phototropic units, utilizing these bodies and that have unusual properties and stability.

Briefly stated, the compounds of the invention are derived from thiocarbohydrazides which have the structural formula:

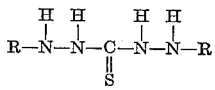

where R is an aryl group.

In their dry state these are usually crystalline compounds but, in solution, what appears to be a molecular rearrangement takes place to form a reactive thiol group producing a reactive hydrogen atom, thus:

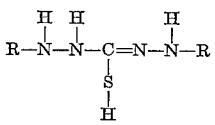

which hydrogen will react with substituted metallo compounds to form a phototropic compound with the following theorized structural formula:

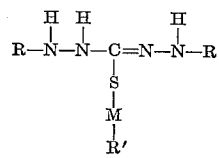

where M is a metal or element selected from the group consisting of bismuth, cadmium, cobalt, copper, gold, indium, iron, lead, manganese, mercury, nickel, palladium, platinum, polonium, silver, tellurium, thallium, tin and zinc; and R' is a radical containing a group selected from those consisting of carboxyl, ether, ester, amide, imide, nitrile, anhydride, amine, halide, nitrate, acrylate, methacrylate, halogenated aryl ethers, pyridyl, sulfonate, isocyanate, thiocyanate, cyanide, molybdate, tungstate and miscellaneous groups.

It is a primary object of this invention to provide an improved phototropic material which can be used in liquid or gel form in cells and so forth and which, in plastic sheet form, is usable either alone or as a commercially practical component of a stable, tightly bonded, all plastic or glass-plastic lamination.

Another object is the provision of a phototropic glazing, or other viewing, working or display unit that embodies the above phototropic material and possesses notably improved color, faster responses and longer effective life than heretofore available in units of this character.

Further objects and advantages of the invention will become more apparent during the course of the following description when read in connection with the accompanying drawings.

In the drawings, wherein like numerals are employed to designate like parts throughout:

Figure 1:
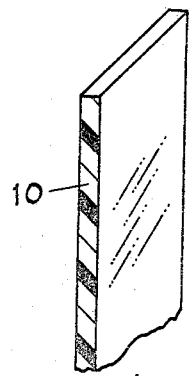
FIG. 1 is a vertical, sectional view through a simple form of phototropic unit produced in accordance with the invention.

While this invention is concerned with and contemplates the use of photochromic, substituted metallo thiocarbohydrazides broadly, especially good results have been obtained with the 1,5,diphenyl-3-thiocarbohydrazides (hereinafter limited in the specification and claims as DPTZ). For this reason the illustrative embodiments will be discussed primarily in this connection and particularly with DPTZ reacted with a mercuric compound to produce a phototropic compound having the following probable (the chemistry of Hg compounds are known to be unusual) structural formula:

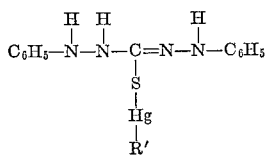

Such a compound can be produced by the single step of reacting any commercially available mercuric compound with DPTZ. However, particularly good results have been obtained by employing mercuric compounds that are not available commercially. In the latter case, because the manner of synthesizing the material may have an effect on the ultimate product with which the compound is associated, two important chemical steps are involved.

METHOD I

Thus, the synthesis of 1,5,diphenyl-3-thiocarbohydrazide-mercury-anisole (hereinafter abbreviated as DPTZ-Hg-anisole), for example, requires:

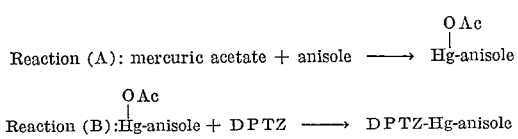

The product of Reaction (B) is the phototropic compound.

Reaction (A) procedure

For the synthesis of the

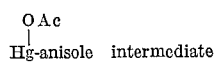 intermediate 60 grams of mercuric acetate was dissolved in 150 ml. of methanol and 10 ml. of glacial acetic acid in a 1 liter round-bottomed flask and 360 ml. of anisole added. A reflux condenser was attached and the solution was held at refluxing temperature for 48 hours. The solution was clear and colorless at this stage. The solvent was evaporated in a rotary evaporator till a thick white slurry was left. The slurry was washed repeatedly with hexane to remove the anisole. The fine solids were then washed repeatedly with water, filtered, and dried at 65° C. A yield of 54.0 grams of fine white crystals was obtained that melted over a temperature range of 162.5 to 170° C. No attempt was made to separate the isomers.

Reaction (B) procedure

For the synthesis of the DPTZ-Hg-anisole, 5.0 grams of

(from methanol system above) was dissolved in 200 ml. of CHCl₃, 6 drops of glacial acetic acid was added, and 3.45 grams of 1,5-diphenyl-3-thiocarbohydrazide slowly added in a beaker equipped with a magnetic stirrer. The solution turned a bright yellow immediately and got darker as the reaction progressed. This solution was stirred for 30 minutes after all the DPTZ was added and the slight excess of DPTZ was then filtered off. The CHCl₃ solution was washed twice, first with H₂O and then the CHCl₃ and then evaporated leaving 7.0 grams of bright red powder.

METHOD II

As an alternate, 1,5,diphenyl-3-thiocarbohydrazide-mercury-anisole was synthesized as follows:

Reaction (A) procedure 25.44 grams of mercuric acetate was dissolved in 240 ml. of trifluoroacetic acid and 34.56 grams of anisole added, and the whole solution warmed to 60° C. over 30 minutes. The solution turned pink. It was cooled and poured with stirring into a solution of 32 grams of NaCl in 1600 ml. of H₂O. A white flocculent precipitate formed immediately. This was filtered, rinsed with water and reslurried repeatedly in water and then hexane, filtered, and dried. The yield was 25.4 grams of fine white powder, melting at 165–170° C.

Reaction (B) procedure

This was the same as in Method I but substituting the

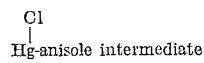 intermediate from Reaction (A) above.

METHOD III

DPTZ-Hg-anisole was also synthesized in this way:

Reaction (A) procedure 3.18 grams of mercuric acetate was dissolved in 20 ml. of acetic acid, warmed, and 1.08 grams of anisole added with stirring. This was heated to 80° C. After 15 minutes no mercuric ions were present. The whole solution was poured into a solution of 3 grams of NaCl in 300 ml. of water with stirring. A white precipitate came out immediately and was filtered, washed repeatedly with water and hexane and dried. The yield was 2.50 grams of white powder melting at 209 to 214° C.

Reaction (B) procedure

Same as in Methods I and II.

METHOD IV 1,5,diphenyl-3-thiocarbohydrazide-mercury-2,4,dichloroanisole (hereinafter abbreviated as DPTZ-Hg-2,4,dichloroanisole) was synthesized as follows:

Reaction (A) procedure 3.18 grams of mercuric acetate was dissolved in 30 ml. of trifluoroacetic acid and 7.1 grams of 2,4-dichloroanisole slowly added, with stirring. This was warmed to 65° C. over 30 minutes. The solution was poured with stirring into a solution of 4 grams of NaCl in 200 ml. of H₂O. A white flocculent precipitate formed, was filtered and reslurried and washed repeatedly with water and then with hexane. A yield of 3.5 grams of white crystalline product was obtained.

Reaction (B) procedure

Same as for the preceding methods.

METHOD V 1,5,diphenyl-3-thiocarbohydrazide-mercury-para-anisole (hereinafter abbreviated as DPTZ-Hg-p-anisole) was synthesized as follows:

Reaction (A) procedure 43.2 grams of Eastman EK No. 465 anisole and 32.0 grams of mercuric acetate, reagent grade, were dissolved in 300 ml. of glacial acetic acid in a 1 liter flask. The reaction was carried out with an air condenser and the flask heated in a bath maintained at 70° C. for 3½ hours. The hot mixture was poured into 1200 ml. of distilled water with vigorous stirring for 1 hour using a magnetic stirrer in a 2000 ml. flask. The white precipitate was vacuum filtered and washed with two 100 ml. portions of distilled water and pressed dry. The solids were air-dried overnight and then dispersed in 800 ml. of hexane and refluxed on a steam plate for 15 minutes. The mixture was stirred at room temperature for 1 hour, cooled in an ice bath, vacuum filtered and the solids washed with two 100 ml. portions of ice cold hexane. The precipitate was air-dried and then placed in a Soxhlet extraction apparatus for 12 hours. A 33 x 80 mm. thimble, 2000 ml. flask and 1000 ml. of hexane were used in the operation. The remaining solids were air-dried and then recrystallized from 300 ml. of methanol. The 8.7 grams of the para isomer obtained (24% yield) had a melting point of 181–182° C.

Reaction (B) procedure

Same as for preceding methods.
The intermediate product

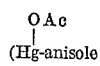
(Hg-anisole of Reaction (A) in Method I reacted faster with DPTZ than any of the other intermediate products of these five methods.

In addition, all of the following compounds, falling within the probable structural formulas set forth above, and many others, were produced by the same general procedures as described in Methods I to V:

DPTZ-Hg-salicylate
DPTZ-Hg-fluorene
DPTZ-Hg-anthranilate
DPTZ-Hg-pyridine
DPTZ-Hg-PMA (phosphomolybdic acid)
DPTZ-Hg-CN
DPTZ-Hg-WO$_4$
DPTZ-Hg-PVMA (phosphovanadomolybdic acid)
DPTZ-Hg-SCN
DPTZ-Hg-stilbene
DPTZ-Hg-chloroanisole
DPTZ-Hg-p-chloroanisole
DPTZ-Hg-fluoroanisole
DPTZ-Hg-p-fluoranisole
DPTZ-Hg-methyl-anthranilate
DPTZ-Hg-biphenyl
Hg (DPTZ)$_2$
DPTZ-Hg-2,5-dimethoxytoluene
DPTZ-Hg-p-phenylanisole
DPTZ-Hg-dimethoxybenzene As indicated above, the phototropic compounds of this invention can be utilized in many different ways. For example:

(I) In producing laminated safety glass units (a) By milling them into the plastic interlayer material (this is preferred);
(b) By dipping the interlayer into the active ingredient to dye the same; and
(c) By spraying a solution onto the plastic interlayer or the glass.

(II) In a film forming resinuous solution which can be used to coat surfaces of articles.

(III) In liquid or gel form in fluid cell structure.

(IV) To impregnate porous structures.

To date, the most valuable commercial application has been in connection with laminated safety glass. Laminated safety glass is probably best known for its use in the automotive field and for that purpose is generally made up of two sheets of glass with an interposed layer of plastic all bonded together under heat and pressure into a unitary structure.

However, in air craft glazings for example, a considerable number of glass sheets may be combined with a number of plastic interlayers while, for other uses, such as in sun glasses, information storage units and in photography, these as well as single plastic sheets, laminations of plastic sheets only and simple glass to plastic laminations may also be used.

According to preferred embodiments of the invention there is provided first, a phototropic body, for example, in sheet form, that can be satisfactorily employed as either interlayer or other laminae in connection with any of the above types of laminations. In this connection, polyvinyl butyral (PVB) is used almost exclusively in the present day manufacture of laminated safety glass. And, when plasticized to an extent common in the laminated glass art with a compatible plasticizer, can be rendered phototropic by incorporating into the plasticized resin, prior to forming it into a sheet, from .01% to 2.0% of one of the phototropic compounds of this invention.

In thicknesses common in automotive laminated safety glass (.015–.030) such a plastic sheet will be yellow in color and, when exposed to sunlight, darkens rapidly, assuming a uniform dark blue color in about 25 seconds. When shielded from the sun and at room temperature it rapidly reverts to the original lighter and more transmissive yellow color, a noticeable change back occurring in less than 15 seconds and 100% reversion in about 5 minutes, or less, depending on temperature.

EXAMPLE

A phototropic plastic sheet was produced by accurately weighing out 0.0750 gram of DPTZ-Hg-anisole and dissolving it in 20 grams of di(isodecyl)-4,5-epoxy tetrahydrophthalate (purchased from Carbide and Carbon Chemical Co. as their "FLEXOL PEP") plasticizer. This solution was stirred into 50 grams of polyvinyl butyral ("Butvar") resin powder until thoroughly mixed and the mixture was then milled at 275° F. into a .015″ thick, 12″x18″ sheet in about 5 minutes after which the milled sheet was cooled and removed from the mill.

The plastic sheet produced in the manner just described, as well as similar sheets incorporating each of the phototropic compounds named above and produced by the same general techniques, were laminated between sheets of glass by conventional safety glass laminating procedures. All of the resulting units exhibited strong color change when tested for phototropic properties.

One of the features of this phase of the invention has to do with the way in which the phototropic resin is plasticized and this involves both the degree of plasticization and the type of plasticizer used. Thus, the chemical reactions within the plastic body both during the darkening and the fading color change require sufficient mobility in the medium for the mechanism to take place. In other words, the efficiency of the photochromic action in a plastic body is, to a notable extent, a function of its softness or degree of plasticization.

Generally speaking, from 25 to 45 parts by weight of plasticizer gives good phototropic results in accordance with this invention and, when the plastic body is used as an interlayer for laminated safety glass, it is preferred that plasticization be well within these limits to also obtain the best physical results. On the other hand, if the plastic body is to be used alone and/or in greater thicknesses, something less than 25 parts plasticizer may be used; or, for special uses more than 45 parts can be used. However, it must be appreciated that as the amount of plasticizer is increased beyond the upper limit the plastic sheet becomes progressively and, ordinarily, objectionably softer; and as the plasticizer is decreased below the lower limit the phototropic action will be slowed down appreciably, especially in the fading or reversion cycle of the color change.

Similarly, the type of plasticizer employed is important and, while in making laminated safety glass units all of the commonly used plasticizers will produce workable phototropic units, more efficient and stable units can be had by a proper selection of plasticizers. For example, in the commercial manufacture of laminated safety glass polyvinyl butyral interlayers are most generally plasticized with 3GH (di-2-ethyl butyrate triethylene glycol), and may be so plasticized in making a phototropic unit of this character. However, the life of such a laminated phototropic unit can be extended by simply employing a different plasticizer. For example, a laminated unit, made up of two ⅛" sheets of iron containing, heat absorbing glass with an interlayer of .015" polyvinyl butyral plasticized with 3GH and rendered phototropic by milling a metal thiohydrocarbohydrazide into the interlayer, was tested along with a unit that was identical, except that the resin was plasticized with di (iso decyl)4,5-epoxy tetrahydrophthalate (PE P), by exposing them 45° to the south in direct sunlight. The unit with the PE P plasticized interlayer had an effective life more than 10 times as long as the 3GH plasticized one.

Other known plasticizers, compatible with polyvinyl butyral, when employed in the same way will give the units effective lives varying in lengths from that of 3GH to that of PE P.

Another feature of the invention that has a pronounced effect on extending the effective life of the phototropic body is the provision of an additional decomposition retarder in or as part of the body. Such a retarder is preferably in the form of a screen designed to cut down materially on the passage to the phototropic material of light rays of a wavelength that have a deleterious action on it while, at the same time, not appreciably interfering with the passage of light in the exciting or activating wavelengths.

One of the advantages of the laminated safety glass or quasi-safety glass phases of this invention is that they provide a built-in decomposition retarder in the sheet or sheets of glass that are laminated to the plastic carrier for the phototropic compound. Thus, all commercial sheet and plate glasses are natural screens since all of them act to cut out the passage of at least some of the light rays at the ultra violet end of the spectrum while being high transmitters of visible light; and their effectiveness as decomposition retarders for the metal thiocarbohydrazides can be enhanced by employing so-called heat absorbing or high iron containing glasses of the character sold by the assignee company under the trade name "E-Z Eye" glass.

Other types of decomposition retarders contemplated by this invention are ultra violet light filters of various kinds, comprising both the absorbing type and reflecting types, and specifically including transparent, reflective films and special color dyes.

Referring now more particularly to the drawings, there has been illustrated in FIG. 1 one of the simpler forms of phototropic body contemplated by this invention and which is a sheet or layer of plastic 10 carrying, and so rendered phototropic by, one of the compounds of the invention which may be milled into the plastic body or applied as a coating or dye onto one of its surfaces. Generally speaking, it is preferred that the compound be milled into the plastic body which is of a thickness and plasticity dependent upon the use to which it is to be put.

Thus, when it is to be used as an interlayer for laminated safety glass the sheet 10 will usually be approximately .015" in thickness and plasticized with around 43 parts plasticizer to give a highly flexible consistency at room temperature. On the other hand, if the sheet 10 is to be used by itself or as an outboard sheet in a laminated unit it may be considerably thicker and more lightly plasticized to provide a self supporting, or even rigid sheet at room temperature.

Figure 2:
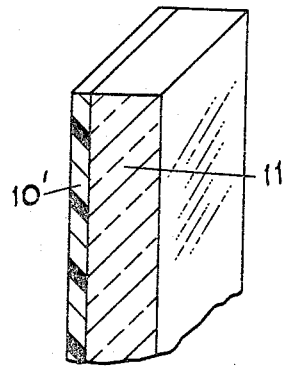
FIG. 2 is a view, similar to FIG. 1 of a phototropic laminated unit incorporating the invention.

The plastic sheet 10 may have a decomposition retarder incorporated into, added onto, or associated with it in any of the ways already suggested and which will be more fully hereinafter described. For example, the simplest form of lamination contemplated by the invention is illustrated in FIG. 2 as being made up of one sheet of phototropic plastic 10' and a single sheet of glass 11 (a rigid sheet of plastic can, of course, be substituted for the glass) bonded to one surface thereof. When this unit is positioned with the glass toward the light source, the glass will serve as a decomposition retarder in the manner already explained.

Figure 3:
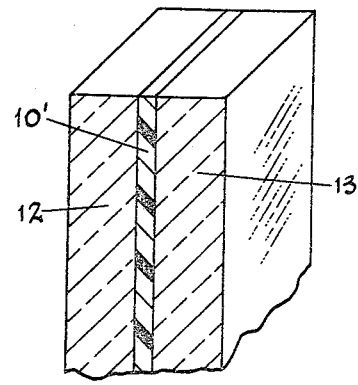
FIG. 3 is a similar view of a conventional laminated safety glass unit that has been rendered phototropic by including a compound of the invention in the interlayer.

The same thing is true with the most commonly used form of laminated safety glass, shown in FIG. 3, where the phototropic interlayer 10' is laminated between two sheets of glass 12 and 13.

Various other combinations of multi-layer glass-plastic laminations, utilizing the glass as a decomposition retarder, can be readily visualized; and the other types of decomposition retarders referred to above can also be incorporated into the laminated glass structures as well as in the various other forms of phototropic units contemplated by the invention.

Thus, UV filter sheets effective for the purpose were produced by milling 50 grams of Butvar, 20 grams 3GH, 0.2100 gram of "Uvinul D-50" (purchased from General Aniline and Film Corporation) and 0.0500 gram of paraoctyl phenol into a .015" thick sheet; and slightly different ones by an identical procedure but employing 20 grams of PE P as the plasticizer. The latter was used where it was desired to place the filter sheet in contact with the phototropic interlayer 10 or 10' because, as explained above, the phototropic material in contact with PE P has a longer effective life.

Other filter layers were provided by spraying blue films of Sn-Sb composition, having a transmittance of 45%, on the glass; by applying SiO films; and by spraying hot glass sheets with an iron compound to form a transparent iron oxide film.

The films alone gave more protection than did the filter sheet alone, the iron oxide and SiO films were much more effective than the Sn–Sb film and the combination of film and filter was very effective in reducing fading.

Figure 5:
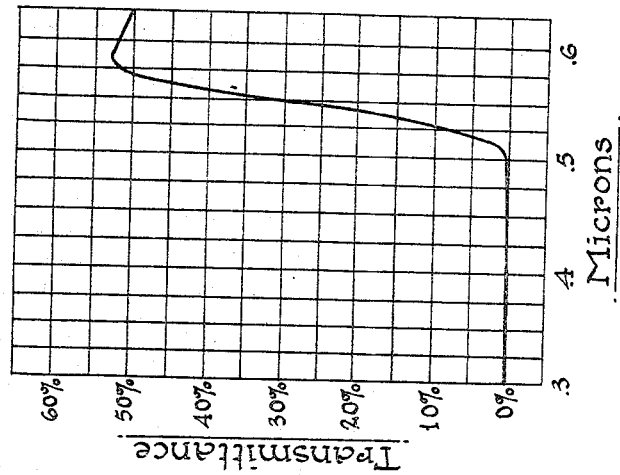
FIGS. 4 and 5 are graphic illustrations of the transmittances of representative forms of the phototropic units of the invention.
Figure 4:
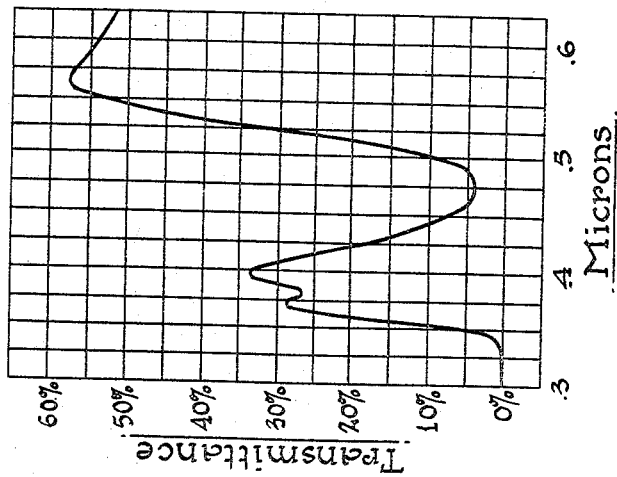

Dyes are also very effective as decomposition retarders and the results of employing high iron heat absorbing glass and a yellow dye for this purpose is graphically illustrated by transmission curves in FIGS. 4 and 5, respectively, of the drawings, based on the knowledge that light rays in the area of the spectrum between about .3 and .5 micron are the ones that cause the most rapid decomposition of and resulting loss of effectiveness in the phototropic compounds of the invention.

Thus, as illustrated in FIG. 4, a sample as shown in FIG. 3 with heat absorbing glass at 12 and 13 and with the interlayer 10' made up of 50 grams of PVB plasticized with 20 grams of PE P and rendered phototropic by having .0750 gram of DPTZ-Hg-p-chloroanisole milled thereinto, and with no other decomposition retarder except the glass in the lamination, shows a peak transmittance of around 30% in the critical .37 to .40 micron area.

However, as can be seen in FIG. 5, when an interlayer is used at 10' that was prepared in the same way, but with only .3000 gram (.43%) of a yellow dye (sold by National Aniline Company as Plasto Yellow MGS) added, a surprising reduction in transmission in the critical area is obtained. In fact, the curve is completely flat between .3 and .5 micron and with practically no loss in visible transmission.

In view of the remarkable performance of the dye and the relative facility with which it can be incorporated into any type of unit from a single layer of phototropic plastic to the most involved glass-plastic type lamination, it provides a very satisfactory decomposition retarder.

In selecting the dye it is only necessary that it be compatible with the materials with which it is to come in contact and that it be of a color generally in the yellow-orange region.

Where, as is generally the case with the phototropic compounds of the invention, the phototropic body is of a yellowish color, the addition of a yellow to orange dye does not materially alter the appearance of the unit. In any event, some modification of the color to improve or enhance appearance or to tone the unit into its environment can be had, as indicated above, by the use of transparent, reflective films of materials that will provide the desired complementary or modifying color.

A large number of sample units of the invention were exposed in Arizona for three months 45° to the south directly to the weather; and Table A below sets forth transmittance data (based on exposure to 43,626 Langleys) for a representative laminated safety glass unit made up as shown in FIG. 3 and incorporating a representative phototropic compound (DPTZ-Hg-p-chloroanisole) and representative decomposition retarders ("Plasto Yellow MGS" dye milled into the interlayer and an iron oxide film on the outboard and exposed side of the glass). The interlayers in each case were in the conventional .015" thickness, the glass sheets were approximately ⅛" thick regular plate glass and the laminating cycle used was 250 p.s.i. at 250° F. for 20 minutes.

In the table transmittance is given for the control sample in the unactivated state and when activated by direct sunlight. The difference in transmittance between the two states represents the phototropic range. The comparable data is then given for the sample exposed direct to the weather in Arizona. The last column in the table shows the percent of phototropic activity remaining in the sample after exposure to 43,626 Langleys and is obtained by dividing the exposed range by the control range. The dark readings were taken as quickly as possible but, since fading starts immediately, these readings are not the exact minimum.

TABLE A

Control sample:
  Unactivated _____ 40.9
  Activated _____ 16.1
  Range _____ 24.8
Exposed sample:
  Unactivated _____ 43.0
  Activated _____ 20.0
  Range _____ 23.0
  Phototropic activity remaining, percent _____ 92.8

Among additional observations made during the extensive tests that were conducted was that a unit like the one reported on in the table, but with DPTZ-Hg-anisole (Method II) in the interlayer, and with no filter sheet or film, lost only 2.3% in transmittance after 700 hours in the Twin Arc Weatherometer.

Although the plastic bodies 10 and 10', which carry the phototropic compounds of the invention, have been described above only as sheets of plasticized polyvinyl butyral resin because of the wide use of that material in laminated safety glass, many other plastic bodies, as well as liquids and gels, can and have been successfully used. Among the suitable resinous carriers, for example, are: cellulose acetate; cellulose acetate butyrate; polyvinyl chloride; hydrocarbon resins, such as polystyrene; and synthetic ester type resins like methyl methacrylate, polymethyl methacrylate, polyethyl methacrylate, and polybutyl methacrylate.

Where a liquid carrier was desired the phototropic compound has been dissolved in one of the well known and suitable solvent systems in a concentration dependent on the use to which it is to be put and the tint desired. In liquid form the body of phototropic material may be used to dip dye plastic sheets or to spray coat plastic or glass. In this form, too, or as a suspension or gel, it can be employed to fill cell type structures.

Figure 6:
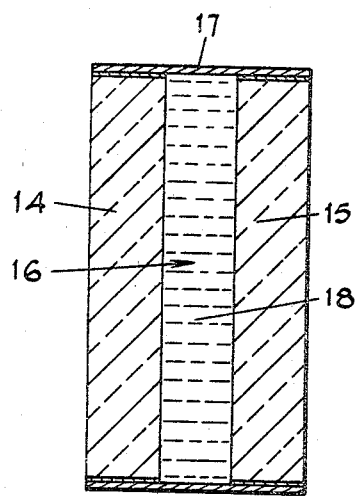
FIG. 6 is a vertical, sectional view through a cell type phototropic unit produced in accordance with the invention.

An example of one such cell type structure is illustrated in FIG. 6 of the drawings and, as there shown, comprises sheets of glass 14 and 15 arranged in spaced, face to face relation with the space 16 between the sheets being enclosed by a conventional metal to glass sealing strip 17 and the space 16 filled with a body of phototropic liquid or gel 18.

Figure 7:
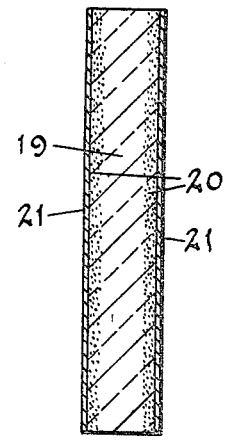
FIG. 7 is a vertical, sectional view of a sheet of porous glass that has been rendered phototropic by impregnating with a liquid phototropic body of the invention.

The liquid form of the phototropic materials of the invention can also be used to impregnate porous glass or plastic to produce a phototropic unit of the character illustrated diagrammatically in FIG. 7. The porous sheet 19 of this unit can be one of the commercially available porous glasses. These are usually silica glasses with pore diameters ranging from about 15 a. to about 200 a. and may be impregnated with the phototropic liquid 20 in any desired manner, such as by simple contact under atmospheric pressure, or after evacuation of the pores in the glass, or by pressure application.

The depth of the pores of the glass, the volume of the pores per volume of glass and the amount of phototropic liquid impregnated into the glass are critical only in that each must be sufficient to enable a color change in the impregnated liquid to be effectively visualized.

The impregnated sheet has the advantages over the liquid cell type structure in that it behaves as a solid body and is not susceptible to minor changes in pressure, to fluid flow or to leaking problems.

Of course, the various forms of decomposition retarders discussed above can be incorporated into the units of FIGS. 6 and 7 as well as into the other single and multiple sheet and laminated units; and film type retarders, when employed as shown at 21 in the unit of FIG. 7, serve the further purpose of entrapping and protecting the phototropic liquid in the pores of the glass.

We claim:
1. A phototropic compound having the following theorized structural formula:

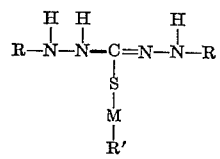

where R is an aryl group; M is a metal or element selected from the group consisting of bismuth, cadmium, cobalt, copper, gold, indium, iron, lead, manganese, mercury, nickel, palladium, platinium, polonium, silver, tellurium, thallium, tin and zinc; and R' is a radical containing a group selected from those consisting of carboxyl, ether, ester, amide, imide, nitrile, anhydride, amine, halide, nitrate, acrylate, methacrylate, halogenated aryl ethers, pyridyl, sulfonate, isocyanate, thiocyanate, cyanide, molybdate, and tungstate.

2. A compound as defined in claim 1, which has the theorized structural formula:

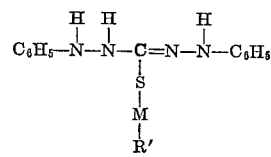

where M is a metal or element selected from the group consisting of bismuth, cadmium, cobalt, copper, gold, indium, iron, lead, manganese, mercury, nickel, palladium, platinum, polonium, silver, tellurium, thallium, tin and zinc; and R' is a radical containing a group selected from those consisting of carboxyl, ether, ester, amide, imide, nitrile, anhydride, amine, halide, nitrate, acrylate, methacrylate, halogenated aryl ethers, pyridyl, sulfonate, isocyanate, thiocyanate, cyanide, molybdate, and tungstate.

3. A compound as defined in claim 1, which has the theorized structural formula:

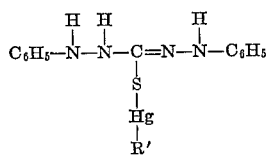

where R' is a radical containing a group selected from those consisting of carboxyl, ether, ester amide, imide, nitrile, anhydride, amine, halide nitrate, acrylate, methacrylate, halogenated aryl ethers, pyridyl, sulfonate, isocyanate, thiocyanate, cyanide, molybdate, and tungstate.

4. A compound as defined in claim 3, which is selected from the group consisting of:
DPTZ-Hg-anisole
DPTZ-Hg-p-anisole
DPTZ-Hg-2, 4, dichloroanisole
DPTZ-Hg-salicylate
DPTZ-Hg-fluorene
DPTZ-Hg-anthranilate
DPTZ-Hg-pyridine
DPTZ-Hg-phosphomolybdic acid
DPTZ-Hg-CN
DPTZ-Hg-WO$_4$
DPTZ-Hg-phosphovanadomolybdic acid
DPTZ-Hg-SCN
DPTZ-Hg-stilbene
DPTZ-Hg-chloroanisole
DPTZ-Hg-p-chloroanisole
DPTZ-Hg-fluoroanisole
DPTZ-Hg-p-fluoroanisole
DPTZ-Hg-methyl-anthranilate
DPTZ-Hg-biphenyl
Hg (DPTZ)$_2$
DPTZ-Hg-2, 5 dimethoxytoluene
DPTZ-Hg-p-phenylanisole
DPTZ-Hg-dimethoxybenzene 5. A compound as defined in claim 3, which is 1, 5, diphenyl-3-thiocarbohydrazide-mercury-anisole.

6. A compound as defined in claim 1, in combination with a carrier therefore.

7. A combination as defined in claim 6 in which said carrier is a plastic body.

8. A combination as defined in claim 6 in which said carrier is a liquid.

9. A combination as defined in claim 6, in which said carrier is a plasticized sheet of polyvinyl butyral and is laminated to at least one sheet of glass.

10. A compound as in claim 1 in combination with a carrier and a dye that is compatible with said compound.

11. A combination as defined in claim 10, in which said carrier is a plastic sheet, and said dye is a yellow dye mixed with the plastic in said sheet.

12. A compound as in claim 1 in combination with a carrier and at least one sheet of glass having a film of iron oxide thereon.

13. A compound carrier as defined in claim 1, in combination with a liquid carrier therefore, and a cell comprising two sheets of glass arranged in spaced, face to face relation with a space between the sheets being enclosed by a sealing strip and the space filled with said compound and said carrier.

14. A compound as defined in claim 1, in combination with a liquid carrier therefore, a sheet of porous glass impregnated with said compound and liquid carrier, and a decomposition retarder in the form of a transparent light reflecting metallic film on a surface of said porous glass sheet which also acts to entrap and protect said carrier in the pores of said glass.

15. A combination as defined in claim 14, in which said film is a film of iron oxide.

References Cited

J.A.C.S., 87, No. 20 (Oct. 20, 1965), pp. 4441–4454.

ROBERT F. BURNETT, Primary Examiner

W. J. VAN BALEN, Assistant Examiner

U.S. Cl. X.R.

161—410; 252—300; 260—41; 350—160

PO-1050
(5/69)

UNITED STATES PATENT OFFICE
CERTIFICATE OF CORRECTION

Patent No. 3,490,988              Dated   January 20, 1970

Inventor(s)   Theodore J. Motter & Paul T. Mattimoe

It is certified that error appears in the above-identified patent and that said Letters Patent are hereby corrected as shown below:

Column 12, line 18, cancel "carrier".

SIGNED AND
SEALED
JUN 9 1970

(SEAL)
Attest:

Edward M. Fletcher, Jr.
Attesting Officer

WILLIAM E. SCHUYLER, JR.
Commissioner of Patents